United States Patent [19]

Thomas

[11] 4,002,078

[45] Jan. 11, 1977

[54] DYNAMICALLY TUNED GYROSCOPES

[75] Inventor: Ivor Lewis Thomas, Wigan, England

[73] Assignee: The Secretary of State for Defence in Her Britannic Majesty's Government of the United Kingdom of Gr. Britain & N. Ireland, London, England

[22] Filed: Feb. 13, 1975

[21] Appl. No.: 549,676

[30] Foreign Application Priority Data

Feb. 14, 1974 United Kingdom .............. 6804/74

[52] U.S. Cl. .................................. 74/5 R; 74/5 F; 308/2 A
[51] Int. Cl.$^2$ ........................................ G01C 19/16
[58] Field of Search .............. 74/5 F, 5 R; 308/2 A

[56] References Cited

UNITED STATES PATENTS

| | | | |
|---|---|---|---|
| 3,301,073 | 1/1967 | Howe | 74/5 F |
| 3,515,006 | 6/1970 | Duck | 74/5 F |
| 3,524,355 | 8/1970 | Barnett et al. | 74/5 F |
| 3,678,764 | 7/1972 | Erdley et al. | 74/5 F |
| 3,702,568 | 11/1972 | Howe | 74/5 F |

Primary Examiner—Samuel Scott
Assistant Examiner—F. D. Shoemaker
Attorney, Agent, or Firm—Cameron, Kerkam, Sutton, Stowell & Stowell

[57] ABSTRACT

A dynamically tuned gyroscope having a single gimbal has torsion flexures with torsional stiffnesses such that, at its tuned speed, the gyroscope is insensitive to angular vibration at a frequency of twice the rotor rotational speed. The drive shaft is connected to a first torsion flexure having an effective torsional stiffness $K_1$ of zero, $K_1$ being made zero by the use of ball races or pivots, by known mechanical methods such as over-center or toggle spring action, or by the use of magnetic or electrostatic systems. The rotor is connected to a second torsion flexure which is orthogonal to the first flexure. The second torsion flexure has a torsional stiffness $K_2$ equal to $4w^2r_3^2m_3$ where $w$ is the tuned rotor speed, $m_3$ is the component mass of a gimbal, on which the torsion flexures are mounted, on an axis through the center of gravity of the gimbal and normal to the plane of the gimbal, and $r_3$ is the distance of the component mass $m_3$ from the center of gravity of the gimbal.

6 Claims, 12 Drawing Figures

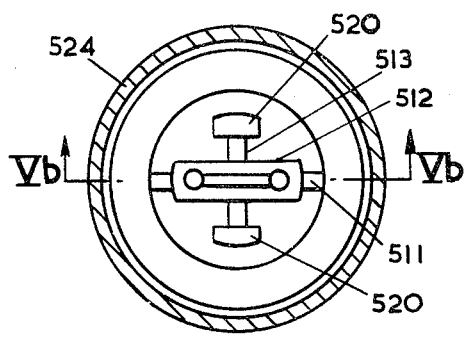
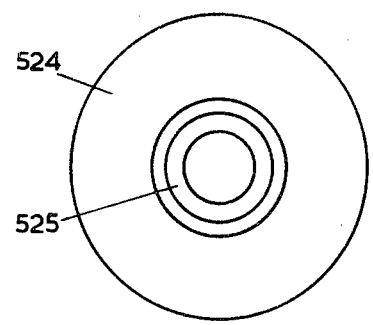
FIG. 5a.   FIG. 5c.
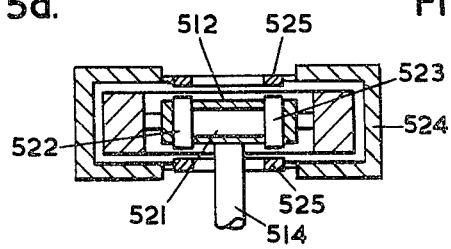
FIG. 5b.
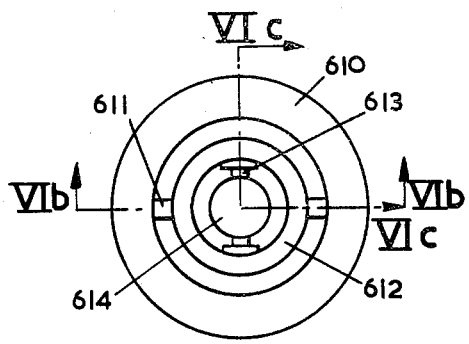
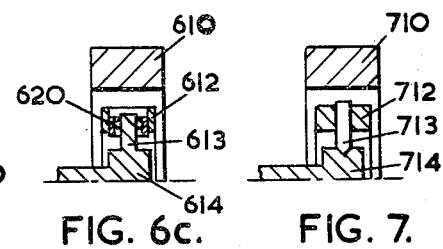
FIG. 6a.   FIG. 6c.   FIG. 7.
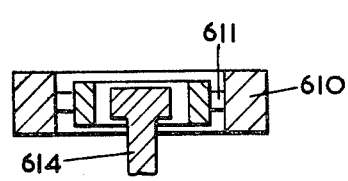
FIG. 6b.
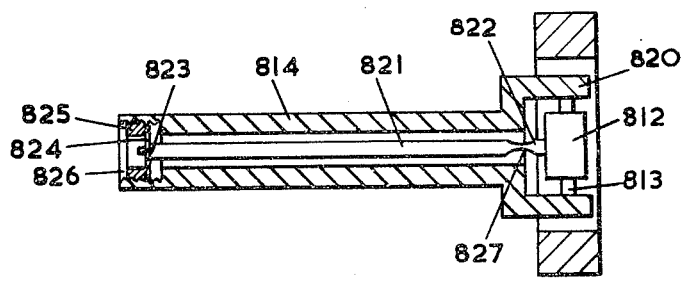
FIG. 8.

DYNAMICALLY TUNED GYROSCOPES

The present invention relates to dynamically tuned gyroscopes.

Dynamically tuned gyroscopes have become well-known in recent years as an alternative to conventional gyroscopes for use in equipments such as inertial guidance systems where a very high degree of accuracy is essential. A typical dynamically tuned gyroscope has a rotor carried by a gimbal which is attached to a drive shaft. The gimbal is joined to the drive shaft and rotor by orthogonal torsion flexures. It is well-known that by correct design of the gimbal and correct choice of torsional stiffness of the flexures the rotor can, for a critical rotation speed known as the tuned speed, be decoupled from small angular movements of the drive shaft. In other words the gimbal inertia generates a negative spring torque which precisely balances the flexure torques, preventing the plane of rotation of the rotor from being affected by angular movements of the drive shaft. The general principles on which dynamically tuned gyroscopes operate are described in UK Pat. No. 599,826, and a single gimbal dynamically tuned gyroscope is described in U.S. Pat. No. 3,103,073 (UK Pat. No. 1,058,780).

It will be appreciated that dynamically tuned gyroscopes are comparatively easy and cheap to manufacture and are potentially comparable in accuracy with conventional precision gyroscopes which demand great accuracy in manufacture and are in consequence very expensive.

A problem which severely affects the accuracy of dynamically tuned gyroscopes is sensitivity to angular vibration at a frequency of twice the rotor rotational speed. These vibrations give rise to precessional forces which act on the rotor and can lead to large errors in operation. A method of combating this problem, as described in U.S. Pat. No. 3,678,764 (UK Pat. No. 1,274,599) involves the use of two or more gimbals angularly offset to one another. Usually two gimbals mutually at right angles are used. Although an effective solution this complicates manufacture and increases the cost of equipment.

The present invention aims to solve the above mentioned problem of angular vibrations at twice the frequency of the tuned rotor speed without using more than one gimbal.

According to the present invention a dynamically tuned gyroscope includes a drive shaft connected to a gimbal by a first torsion flexure and a rotor connected to the gimbal by a second torsion flexure, the first and second torsion flexures being substantially orthogonal, the first torsion flexure having an effective torsional stiffness $K_1$ of zero and the second torsion flexure having an effective torsional stiffness $K_2$ equal to $4w^2 r_3^2 m_3$ where $w$ is the tuned rotational speed of the rotor, $m_3$ is the component mass of the gimbal on an axis through the centre of gravity of the gimbal and normal to the plane of the gimbal, and $r_3$ is the distance of the component mass $m_3$ from the centre of gravity of the gimbal.

$K_1$ can be made zero by, for example, using ball races or pivots on the torsion flexure, by using known methods such as an over-centre or a toggle spring action, or by adding a magnetic or electrostatic system adjacent to the gimbal to produce a magnetic or electrostatic spring combating the torsion effect of the relevant torsion flexure.

It will be appreciated that in practice when designing a dynamically tuned gyroscope the tuned rotational speed $w$ will be decided largely by the power supply available. For example aircraft commonly have a 400 hertz alternating current electrical supply, and gyroscopes designed for use in aircraft with such a supply will run at 24,000 revolutions per minute, or a fraction or multiple of 24,000 revolutions per minute.

Whilst the torsional flexures of dynamically tuned gyroscopes currently produced are exactly orthogonal within mechanical tolerances, a copending application describes how a slight degree of non-orthogonality can be advantageous.

In order that the invention can be better understood, one embodiment of the invention, one theory of operation, and one method of design, will now be described, by way of example only, with reference to the following diagrammatic drawings, of which:

FIGS. 5a, 5b and 5c illustrate an embodiment of the invention comprising a magnetic system, FIGS. 6a, 6b and 6c illustrate an embodiment of the invention comprising ball races, FIG. 7 is a detailed view of an embodiment of the invention comprising a pivot, and FIG. 8 is an embodiment of the invention comprising an over-centre means.

Figure 1:
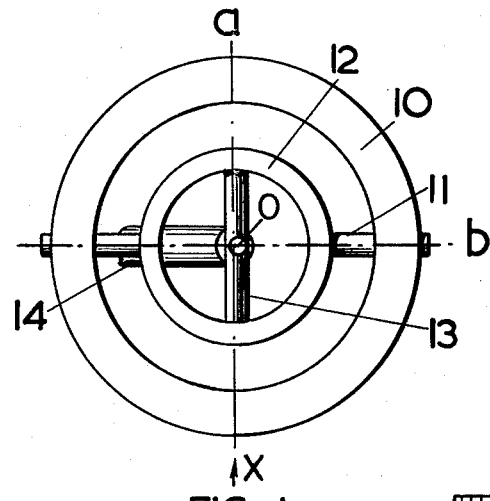
FIG. 1 is a plan view of a gyroscope according to the invention.

A dynamically tuned gyroscope (FIGS. 1, 2 and 3) has a rotor 10, a gimbal ring 12 and a drive shaft 14. The drive shaft 14 is connected by a first torsion flexure 13 to the gimbal ring 12, the first flexure 13 being mounted along a diameter of the gimbal ring 12 and being freely pivotable so as to have an effective torsional stiffness $K_1$ of zero.

The rotor 10 is rigidly connected to the gimbal ring 12 by a second torsion flexure 11 which has a torsional stiffness $K_2$ about a diametral axis of the gimbal ring 12. The magnitude of $K_2$ is designed to be a particular relationship, as defined below, of a tuned speed of the assembly and of the inertial properties of the gimbal ring 12.

Figure 2:
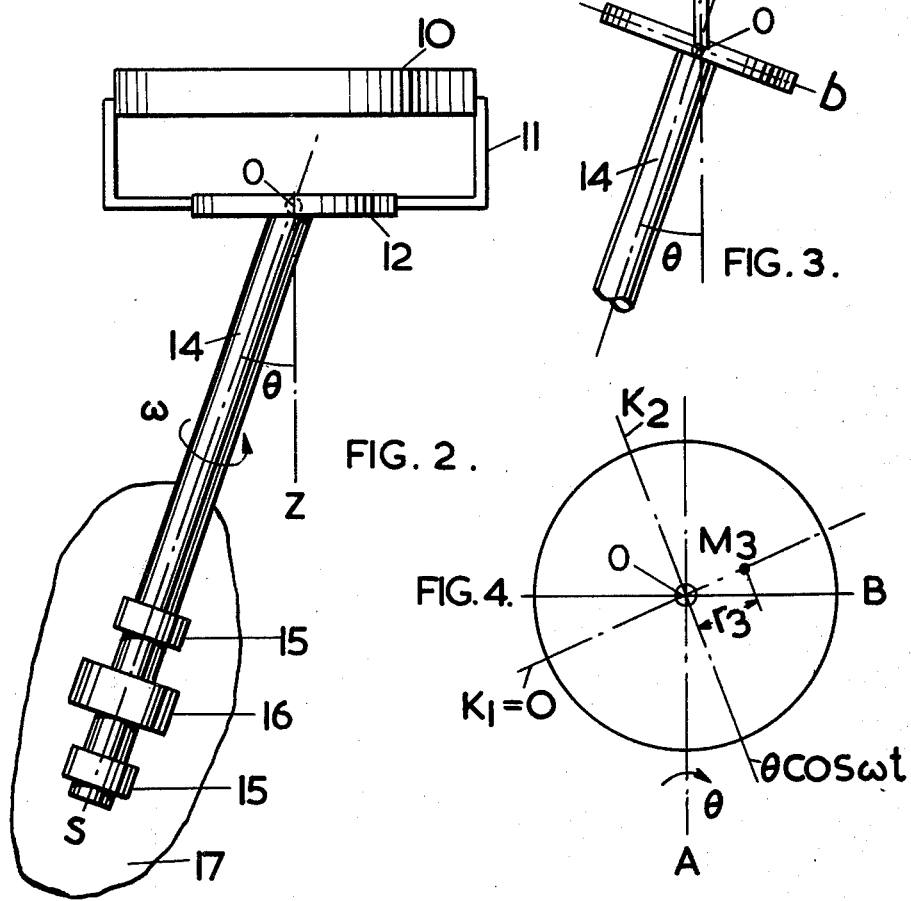
FIG. 2 is an elevation in the direction of arrow X on FIG. 1.

The drive shaft 14 is mounted in bearings 15 and is driveable by a constant speed motor 16 (FIG. 2). The bearings 15 and motor 16 are mounted on structure 17.

Figure 3:
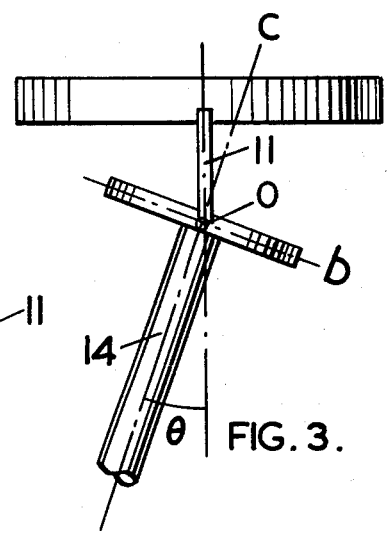
FIG. 3 is an elevation similar to FIG. 2 after the drive shaft gimbal and rotor have rotated through an angle of $\pi/2$.

In operation, the constant speed motor 16 rotates the shaft 14 at a rotational speed $w$, hence driving the rotor 10 via the flexure 13, gimbal ring 12 and flexure 11. As illustrated in FIGS. 2 and 3 the rotor 10 is rotating about an axis OZ and the drive shaft 14 about an axis OS offset from the axis OZ by a small angle $\theta$. As will be apparent from FIG. 3 the flexure 11 must flex to allow the rotor 10 to maintain its plane of rotation. The torsional stiffness of the flexure 11 might be expected to give rise to precession forces which would cause the rotor 10 to precess. However, as explained above, it is well-known that in the general case when $K_1$ does not equal zero, with correct choice of $w$, $K_1$, $K_2$ and gimbal 12 design the inertial effects of the gimbal 12 can be made to cancel the torsional effects of flexures 11, 13. It will now be explained how, with $K_1$ equal to zero, $K_2$ can be chosen to give the same effect and also to obviate the oscillatory vibration problem mentioned above.

Figure 4:
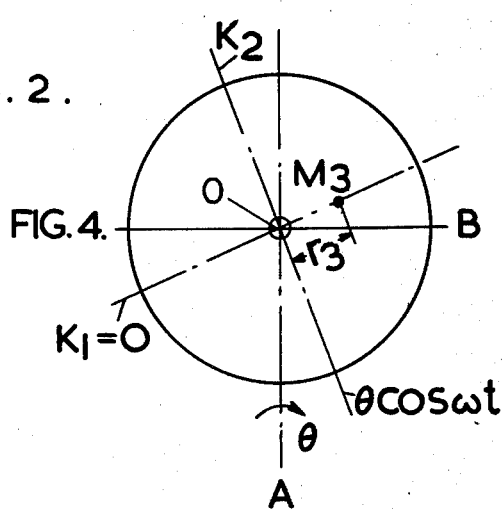
FIG. 4 is a plan view of a pair of orthogonal torsion flexures.

Considering FIG. 4 which diagrammatically illustrates a pair of orthogonal flexure members constrained to operate as do the flexure members 11, 13, assuming a displacement of $\theta$, rotational speed $w$, torsional stiffness $K_1 = 0$ and $K_2$, and a starting position defined by axes OA, OB corresponding to the position illustrated in FIG. 2:

After a time $t$, the angular displacement of $K_2 = \theta \cos wt$, ∴ the torque applied to the rotor about the $K_2$ axis $= K_2 \theta \cos wt$
Resolving onto the fixed axes OA, OB,
The flexure applied torque about axis OA, $$T_{OA}(S) = K_2 \theta \cos^2 wt$$
$$= \frac{K_2 \theta}{2} (1 + \cos 2wt) \quad (1)$$

and the flexure applied torque about axis OB, $$T_{OB}(S) = K_2 \theta \cos wt \sin wt$$
$$= \frac{K_2 \theta}{2} \sin 2wt \quad (2)$$

If $\theta$ is made oscillatory at a frequency of $2w$, $$\theta = \hat{\theta} \cos(2wt + \phi)$$

then $$T_{OA}(S) = \frac{K_2 \hat{\theta}}{4} (\cos \theta + 2\cos(2wt + \theta) + \cos(4wt + \theta)) \quad (3)$$

$$T_{OB}(S) = \frac{K_2 \hat{\theta}}{4} (-\sin \theta + \sin(4wt + \theta)) \quad (4)$$

Now consider the torques caused by the inertial effects due to motion of the gimbal 12.

Considering the inertia to be due to point masses $m_1$, $m_2$, $m_3$ acting at radii $r_1$, $r_2$ and $r_3$ respectively along axes Oa, Ob, Oc respectively (FIGS. 1 and 3), it will be apparent from considerations of symmetry that precessing forces due to motion of $m_1$ and $m_2$ will be self-cancelling over one cycle of the gimbal 12. Dynamic torques will however arise from motions of the mass $m_3$.

Referring again to FIG. 4.

Displacement of $m_3$ off centre due to $\theta = r_3 \theta \cos wt$ (considering $\theta$ to be a small angle).
∴ Displacement along OA $= -r_3 \theta \cos wt \sin wt$,
and Displacement along OB $= r_3 \theta \cos^2 wt$
By double differentiation:
Acceleration of $m_3$ along OA $$= -\frac{r_3}{2} (-4w^2 \theta \sin 2wt + 4w \dot{\theta} \cos 2wt + \ddot{\theta} \sin 2wt)$$

and Acceleration of $m_3$ along OB $$= \frac{r_3}{2} (-4w^2 \theta \cos 2wt - 4w \dot{\theta} \sin 2wt + \ddot{\theta}(1 + \cos 2wt))$$

The torques about OA and OB due to inertial effects $T_{OA}(I)$ and $T_{OB}(I)$ putting $4w^2 r_3^2 m_3 = D$, are therefore, when $\theta$ is constant;

$$T_{OA}(I) = -\frac{D\theta}{2} (1 - \cos 2wt) \quad (5)$$

$$\text{and } T_{OB}(I) = +\frac{D\theta}{2} \sin 2wt \quad (6)$$

and when $$\theta = \hat{\theta} \cos(2wt + \phi)$$

$$T_{OA}(I) = -\frac{D\hat{\theta}}{4} (\cos \phi + 2\cos(2wt + \phi) - 3\cos(4wt + \phi)) \quad (7)$$

$$T_{OB}(I) = \frac{D\hat{\theta}}{4} (\sin \phi + 4\sin(2wt + \phi) + 3\sin(4wt + \phi)) \quad (8)$$

Collecting steady components of torque, when $\theta$ is constant. Total torque about OA, $T_{OA}(T)$ $$= T_{OA}(S) + T_{OA}(I), \text{ which from Equations 1, 5,}$$

$$= \frac{K_2 \theta}{2} - \frac{D\theta}{2} + \text{oscillatory terms.}$$

Total torque about OB, $T_{OB}(T)$ $= T_{OB}(S) + T_{OB}(I)$, which from Equations 2, 6 = 0 + oscillatory terms.

The oscillatory terms give no mean or constant torque, therefore when $K_2 = D$ the gyroscope is tuned — that is there is no constant torque to cause precession errors.

When $\theta$ is oscillatory, $\theta = \hat{\theta} \cos(2wt + \phi)$ from Equations 3 and 7 total torque about OA, $$T_{OA}(T) = \frac{K_2 \hat{\theta}}{4} \cos \phi - \frac{D\hat{\theta}}{4} \cos \phi + \text{oscillatory terms.}$$

and total torque about OB, $$T_{OB}(T) = -\frac{K_2 \hat{\theta}}{4} \sin \phi + \frac{D\hat{\theta}}{4} \sin \phi + \text{oscillatory terms.}$$

Therefore again when $K_2 = D$ there is no constant torque to cause precession errors.

It can thus be seen that by making $K_1 = 0$ and $K_2 = 4w^2 r_3^2 m_3$, a dynamically tuned gyroscope is obtained which is not sensitive to vibrations at frequencies, of twice the rotor rotational speed, which have been found to affect the accuracy of conventional single gimbal dynamically tuned gyroscopes.

As stated before $w$ will in general be determined by power sources available in the environment in which a particular gyroscope is to be used. Design of a gimbal having suitable values of $m_3$ and $r_3$ to enable a flexure 11 to have the correct torsional stiffness, and also to be satisfactory from other viewpoints such as longitudinal rigidity and fatigue life, will be a matter of routine to those skilled in the art. The principles to be followed have been described in many documents, of which U.S. Pat. Nos. 3,301,073 and 3,678,764 UK Pat. Nos. 599,826, 1,058,780 and 1,274,599 have been mentioned above.

It will be apparent that as design and construction of a dynamically tuned gyroscope according to the present invention is very similar to that of a conventional dynamically tuned gyroscope, and as the mechanical problems associated with construction of conventionally tuned gyroscopes are well documented and well-known to those skilled in the art, the embodiment described with respect to FIGS. 1 to 3 has been kept as simple as possible to simplify understanding of the principles on which the invention is based. Practical embodiments of the invention can be expected to differ in many ways from the illustrated FIGS. 1 to 3.

In FIGS. 5a, 5b and 5c an embodiment comprising magnetic means is illustrated. A gimbal 512 of bar form is mounted on first torsion flexure means 513 extending along its minor axis between prongs 520 at the end of a drive shaft 514 (for clarification see FIG. 8). A rotor 510 is secured to the gimbal 512 by second torsion flexure means 511 which extend along the major axis of the gimbal 512. Extending along the gimbal 512 and embedded therein is a permanent magnet 521 which has end pieces in the form of cylindrical poles 522, 523. Secured to a non-magnetic casing 524 adjacent to the pole pieces 522, 523 on each side of the gimbal 512 is an annular pole piece 525. The effective torsional stiffness $K_1$ of the first torsion flexure means 513 is made zero for the tuned frequency $w$ by suitable choice of the first flexure means 513, strength of the permanent magnet 521 and gaps between the poles 522, 523 and annular poles 525. Methods of adjustment of this type of arrangement are well known in the art and are described, for example, in UK Pat. No. 1,216,323.

In a simpler form of the invention (FIGS. 6a, 6b and 6c) a drive shaft 614 is connected to a gimbal ring 612 by first torsion flexure means 613. The gimbal ring 612 is connected to a rotor 610 by second torsion flexure means 611, the torsion flexure means 611 and 613 being orthogonal. The effective torsional stiffness $K_1$ of the first torsion flexure means 613 is made zero by mounting the ends of the torsional flexure means 613 in miniature ball races 620 mounted in the gimbal ring 612 (FIG. 6). As an alternative method (FIG. 7) pivots, such as the pivots shown at 713, secured in a gimbal ring 712 pivotally engage a drive shaft 714. With these embodiments of the invention the life might be expected to be short due to wear in the bearings 620 or pivots 713, but the embodiments might be useful, for example, in short range guided missiles which only have short lives themselves.

In an alternative method of making $K_1$ zero the use of the well known principle of over-centre flexures is used. One use of an over-centre flexure is described in detail in U.S. Pat. No. 3,529,477 but will be described briefly here. A drive shaft 814 (FIG. 8) of hollow cylindrical form has forked end pieces 820 which are secured by first torsion means 813 to a bar type gimbal 812. A rod 821 lying within the drive shaft 814 is connected at first end 822 to the gimbal 812 and at a second end 823 to a resilient diaphragm 824, the pressure in the diaphragm 824 being adjustable by means of a nut 825 which screws into a cavity 826 at the base of the drive shaft 814. The rod 821 is necked at a position 827 adjacent to its attachment to the gimbal 812. Torsional effects acting on the gimbal 812 due to the first flexure means 813 and the rod 821 are known to act in opposition, so the effective torsional stiffness $K_1$ of the first torsion flexure means 813 can be made zero by suitable adjustment of the pressure in the resilient diaphragm 824 and hence of the pressure in the rod 821.

Similarly when used in equipment such as an aircraft inertial guidance system means must be used for sensing reactions of the rotor 10 to acceleration inputs. Sensing means as known and as used with conventional dynamically tuned gyroscopes can be used with the present invention. Such means form no part of the present invention and consequently are not described herein.

What I claim is:

1. A dynamically tuned gyroscope comprising a rotor to be rotated, a driving member rotatable about an axis fixed therein, a single gimbal member, first torsion flexure means extending along a first axis of symmetry of said gimbal member and connecting said driving member to said gimbal member, a second torsion flexure means extending along a second axis of symmetry of said gimbal member, said first and second axes of symmetry being at right angles to each other, said second torsion flexure means connecting said gimbal to said rotor and having an effective torsional stiffness $K_2$ equal to $4w^2 r_3^2 m_3$ where $w$ is the tuned rotational speed of said rotor, $m_3$ is the component mass of said gimbal on an axis through the centre of gravity of the gimbal and normal to said first and second axes of symmetry and $r_3$ is the distance of the component mass $m_3$ from the centre of gravity of the gimbal, and means for making the effective torsional stiffness $K_1$ of said first torsion flexure means zero.

2. A dynamically tuned gyroscope as claimed in claim 1 wherein said means for making the effective torsional stiffness $K_1$ of said first torsion flexure means zero comprises a magnetic system.

3. A dynamically tuned gyroscope comprising a rotor to be rotated, a driving member rotatable about an axis fixed therein and having an end terminating in two prongs, a single gimbal member comprising a permanent magnet having north and south pole pieces, first torsion flexure means comprising a first pair of flexures each extending inwardly from one of said prongs to said gimbal, said first flexures lying along a first axis of symmetry of said gimbal member and securing said gimbal to said prongs, second torsion flexure means comprising a second pair of flexures each extending from one extremity of a second axis of symmetry of said gimbal to said rotor, said second flexures lying along said second axis of symmetry and securing said gimbal to said rotor, said first and second axes of symmetry being at right angles, said second torsion flexure means having an effective torsional stiffness $K_2$ equal to $4w^2 r_3^2 m_3$ where $w$ is the tuned rotational speed of the rotor, $m_3$ is the component mass of said gimbal on an axis through the centre of gravity of the gimbal and normal to said first and second axes of symmetry and $r_3$ is the distance of the component mass $m_3$ from the centre of gravity of the gimbal, and a pair of annular pole pieces secured to a casing and positioned one on each side of said gimbal member so that rotation of said gimbal member causes said north and south pole pieces to rotate between said annular pole pieces, the torsional stiffness of said first torsion flexure means, the strength of said permanent magnet and the gaps between said north and south poles and said annular poles being such that when said gimbal is rotating at the tuned rotational speed $w$ of said rotor the effective torsional stiffness $K_1$ of said first torsion flexure is zero.

4. A dynamically tuned gyroscope as claimed in claim 1 wherein said means for making the effective torsional stiffness $K_1$ of said first torsion flexure means zero comprises ball bearings.

5. A dynamically tuned gyroscope as claimed in claim 1 wherin said means for making the effective torsional stiffness $K_1$ of said first torsion flexure means zero comprises pivots.

6. A dynamically tuned gyroscope as claimed in claim 1 wherein said means for making the effective torsional stiffness $K_1$ of said first torsion flexure means zero comprises an over-centre action flexure.

* * * * *